United States Patent
Zeng et al.

(10) Patent No.: US 11,474,418 B2
(45) Date of Patent: Oct. 18, 2022

(54) CAMERA MOUNT SYSTEM

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 252 days.

(21) Appl. No.: 16/816,191

(22) Filed: Mar. 11, 2020

(65) Prior Publication Data

US 2021/0286237 A1 Sep. 16, 2021

(51) Int. Cl.
| | |
|---|---|
| G03B 17/56 | (2021.01) |
| F16M 11/12 | (2006.01) |
| F16M 11/20 | (2006.01) |
| F16M 13/02 | (2006.01) |
| F16M 11/04 | (2006.01) |

(52) U.S. Cl.
CPC ......... *G03B 17/561* (2013.01); *F16M 11/126* (2013.01); *F16M 11/048* (2013.01); *F16M 11/2014* (2013.01); *F16M 13/02* (2013.01); *F16M 2200/04* (2013.01)

(58) Field of Classification Search
CPC .. G03B 17/561; F16M 11/126; F16M 11/048; F16M 11/2014; F16M 13/02; F16M 2200/04
USPC ....................................... 396/428; 248/187.1
See application file for complete search history.

(56) References Cited

U.S. PATENT DOCUMENTS

| | | | | |
|---|---|---|---|---|
| 5,039,050 | A * | 8/1991 | Eidschun | F16M 13/022 248/279.1 |
| 5,246,193 | A * | 9/1993 | Faidley | B60R 11/04 224/401 |
| 5,397,041 | A * | 3/1995 | Bruseker | G03B 17/561 224/265 |
| 5,835,808 | A * | 11/1998 | Parker | B60R 11/04 396/419 |
| 6,042,080 | A * | 3/2000 | Shepherd | B60R 11/00 248/163.1 |
| 9,753,358 | B1 * | 9/2017 | Hsin | F16M 11/425 |
| 10,435,117 | B1 * | 10/2019 | Cifers | A47G 23/0225 |
| 11,163,312 | B2 * | 11/2021 | Gist, IV | G01S 7/4813 |
| 2005/0265711 | A1 * | 12/2005 | Heibel | F16M 11/42 396/419 |
| 2014/0016922 | A1 * | 1/2014 | Greenthal | H04N 5/23299 396/419 |
| 2014/0161434 | A1 * | 6/2014 | Koymen | F16M 11/043 396/428 |
| 2014/0299013 | A1 * | 10/2014 | Hall | E01B 5/02 104/307 |
| 2015/0233521 | A1 * | 8/2015 | Hida | F16M 11/045 248/429 |
| 2015/0234258 | A1 * | 8/2015 | Hida | F16M 11/425 396/428 |

(Continued)

*Primary Examiner* — Clayton E. LaBalle
*Assistant Examiner* — Kevin C Butler
(74) *Attorney, Agent, or Firm* — Loza & Loza, LLP; Derek Yeung

(57) ABSTRACT

A camera mount that can provide high stability, ease of operation, and flexible configurations for different applications and installation scenarios. The camera mount has an improved attachment mechanism that provides multiple locking positions and strengthened positioning pins. The camera mount has a plurality of anchoring devices capable of securing the camera mount on different curved surfaces.

23 Claims, 12 Drawing Sheets

(56) References Cited

U.S. PATENT DOCUMENTS

| | | | |
|---|---|---|---|
| 2015/0248048 A1* | 9/2015 | Jung | G03B 17/561 |
| | | | 396/428 |
| 2018/0037172 A1* | 2/2018 | Nelson | B60R 11/04 |
| 2019/0126846 A1* | 5/2019 | Yerdon | F16B 7/1454 |
| 2019/0317384 A1* | 10/2019 | Egor | F16M 11/043 |
| 2020/0109813 A1* | 4/2020 | Geerds | F16M 11/2078 |
| 2020/0169650 A1* | 5/2020 | Fellinger | F16M 13/022 |
| 2020/0229894 A1* | 7/2020 | Chang | F16M 11/08 |
| 2021/0009039 A1* | 1/2021 | Berne | B60R 1/074 |
| 2021/0286237 A1* | 9/2021 | Zeng | G03B 17/561 |

\* cited by examiner

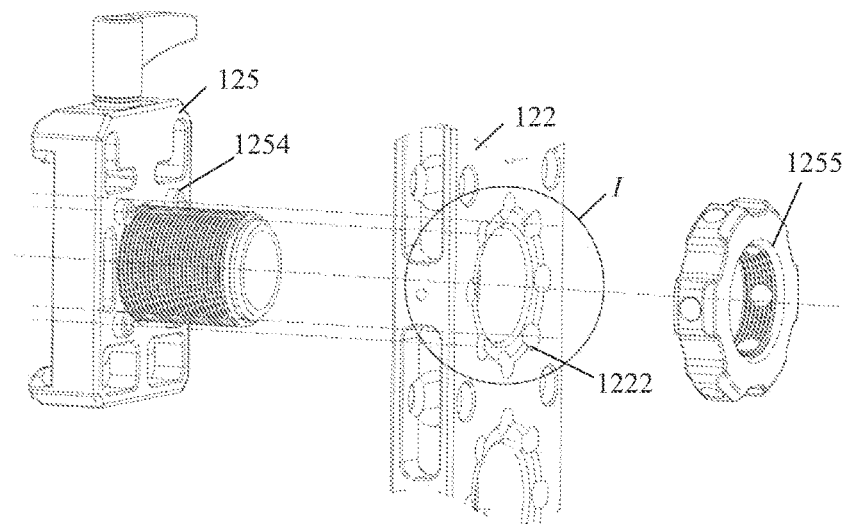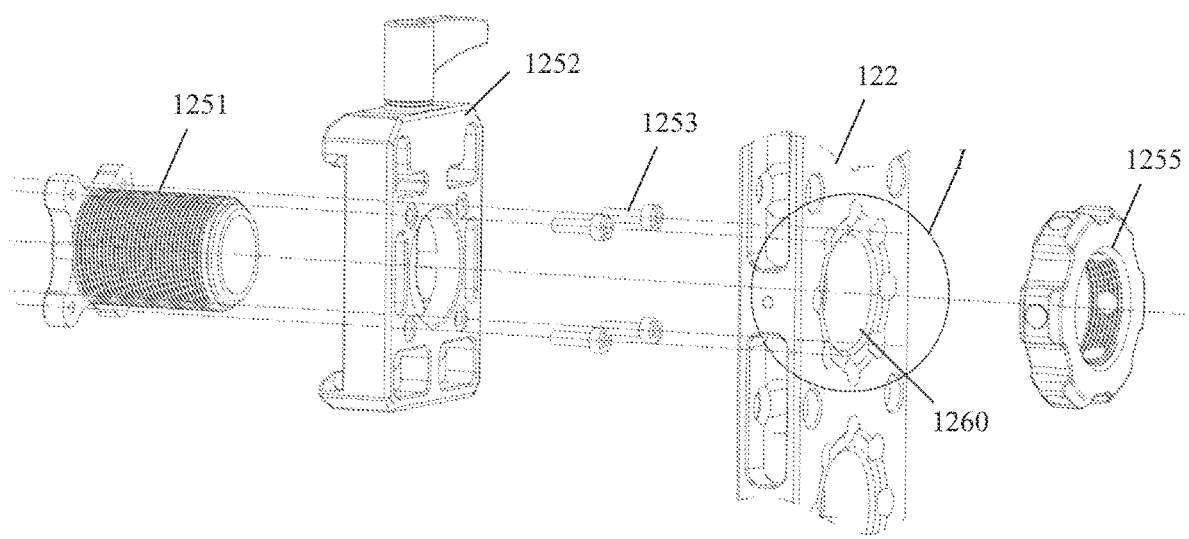
FIG. 4

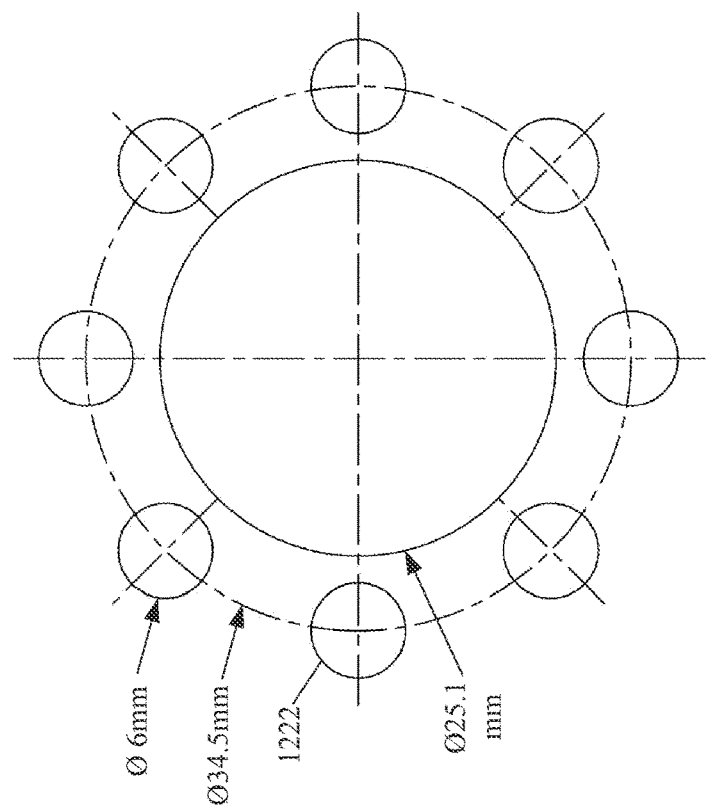
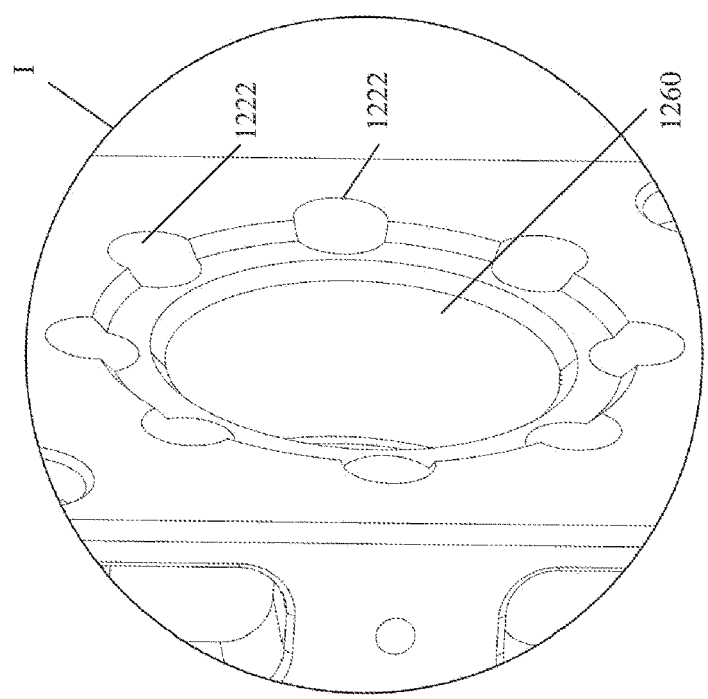
FIG. 5

CAMERA MOUNT SYSTEM

TECHNICAL FIELD

The present disclosure relates generally to a camera mount that can detachably secure a camera to various surfaces, in particular, a camera mount for attaching a camera to an exterior of a vehicle for shooting pictures and video.

INTRODUCTION

In motion picture or video production, photographers or videographers can employ different camera mounts or support systems to obtain clear pictures or videos under a variety of circumstances. For example, a photographer may need to use a camera to take pictures or shoot video from a moving vehicle. Under such conditions, a camera mount can secure a camera to a stable surface of a vehicle. A camera mount is more versatile if it can be installed on different parts of a vehicle and/or different vehicles. The vehicle can be a car, truck, airplane, boat, watercraft, or any moving vehicles. It is desirable that the camera mount is adjustable and adaptable to be able to securely mount a camera to vehicles of various sizes and shapes. Further, it is desirable for a camera mount to be versatile in positioning a camera in any desired orientations with respect to the vehicle. It is also desirable that the camera mount can be quickly and easily assembled, adjusted, reconfigured, and disassembled. It is desirable that the camera mount can stabilize the camera during shooting even when the vehicle is not steady.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a camera mount that can provide high stability, ease of operation, and flexible configurations suitable for different applications and installation scenarios.

One aspect of the present disclosure provides a camera mount for mounting a camera on a surface. The camera mount includes a frame that comprises a plurality of elongated members removably and slidably connected to one another. The camera mount further includes at least two vacuum-operated anchoring devices removably attached to the frame. The camera mount further includes a damping mechanism attached to the frame for holding the camera and dampening vibration on the camera. Each of the at least two vacuum-operated anchoring devices is pivotable around at least one axis, but not about other axes with respect to the frame.

One aspect of the present disclosure provides a camera mount for mounting a camera on a surface. The camera mount includes an adjustable frame that includes a plurality of elongated members removably and slidably connected to one another. The camera mount further includes a plurality of vacuum-operated anchoring devices removably attached to the adjustable frame in a planar area defined by the adjustable frame. Each of the plurality of anchoring devices is restricted to be pivotable around at least one axis, but not other axes with respect to the adjustable frame.

One aspect of the present disclosure provides a camera mount system for mounting a camera on a surface. The camera mount system includes a plurality of support members for forming an adjustable frame for holding the camera. A first support member of the support members includes a slider pivotably connected to one end of the first support member, and the slider is configured to removably and slidably connect to a second support member of the plurality of support members. The camera mount system further includes a plurality of vacuum-operated anchoring devices configured to be connected to the adjustable frame for removably attaching the adjustable frame to the surface. Each of the plurality of anchoring devices includes a rotating mechanism that restricts each anchoring device to rotate around at least one axis, but not other axes.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 4 and 5 are drawings illustrating an attachment mechanism of the camera mount according to one embodiment.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Aspects of the present disclosure provide a camera mount that can provide high stability, ease of operation, and flexible configurations suitable for different applications and installation scenarios. In one aspect of the disclosure, the camera mount has an improved attachment mechanism that provides multiple locking positions and strengthened positioning pins. In one aspect of the disclosure, the camera mount has a plurality of anchoring devices capable of securing the camera mount on different curved surfaces.

Figure 1:
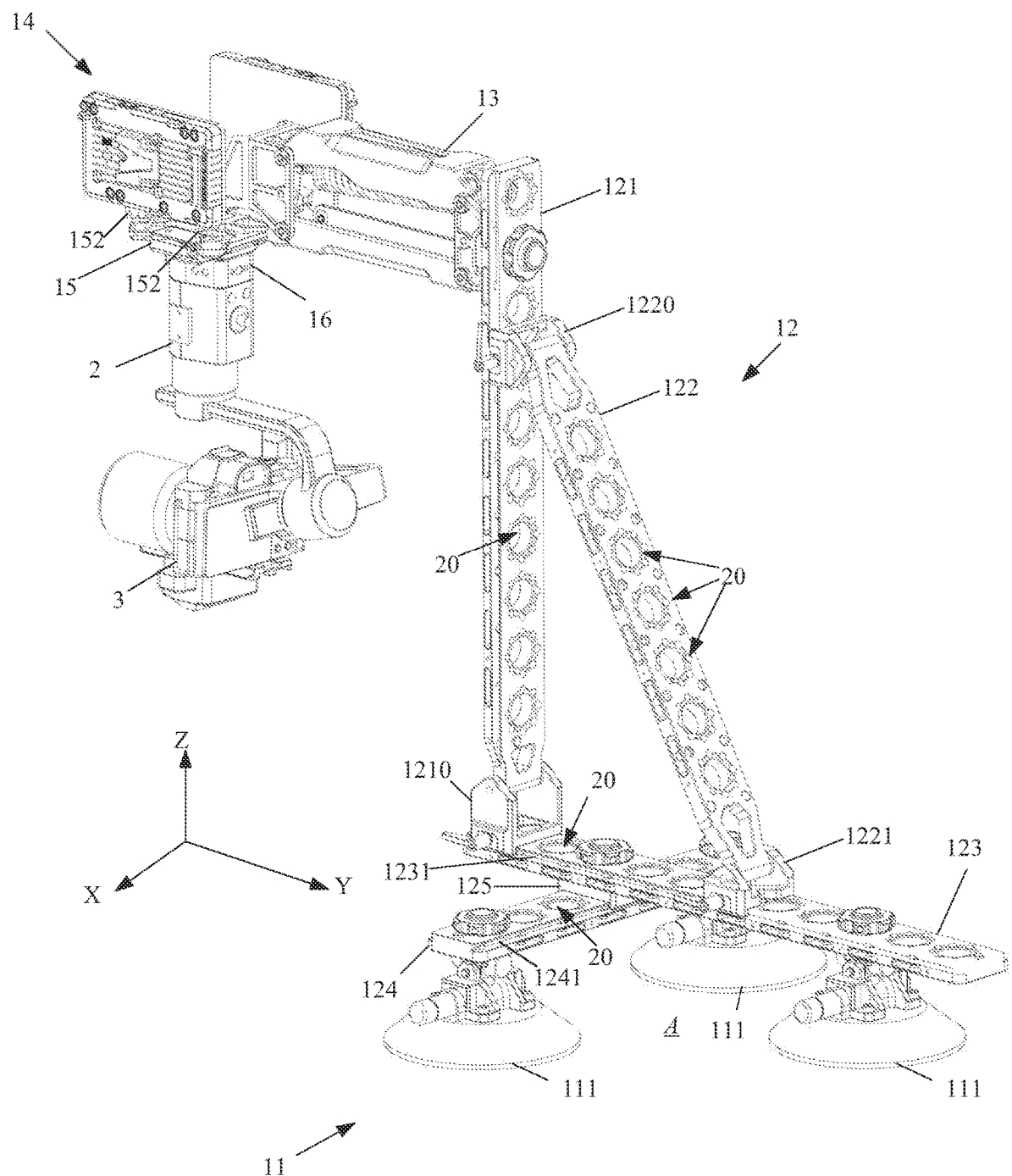
FIG. 1 is a drawing illustrating a first embodiment of a camera mount.

Referring now to the drawings, in one embodiment, a camera mount has a base 11, a frame 12, a spring-loaded damping arm 13, a power module 14, a vibration isolation mechanism 15, and an auxiliary coupler 16. The base 11 includes two or more vacuum-operated anchoring devices 111 arranged on a planar area A defined by the frame 12. In one embodiment, the vacuum-operated anchoring devices may be suction cups or the like. Each suction cup is attached to a first side of a rotating mechanism 112, and an attachment post 113 extends from a second side of the rotating mechanism 112. The attachment post 113 is provided for attaching the suction cup to the frame 12. The rotating mechanism 112 allows the suction cup 111 to rotate around two axes (e.g., X axis and Y axis shown in FIG. 1), but prevents or restricts the suction cup 111 from moving in other directions (e.g., a direction along the Z axis shown in FIG. 1). The rotating mechanism 112 enables the suction cup 111 to be adjusted such that a vacuum generating surface of the suction cup can be positioned toward a surface to which the suction cup adheres. At the same time, the rotating mechanism 112 limits the movement of the suction cup in a direction that is perpendicular to the surface.

In one embodiment, the frame 12 is formed by a plurality of support members, for example, a first (L1) support member 121, a second (L2) support member 122, a third (L3) support member 123, and a fourth (L4) support member 124. In one example, each support member may have an elongated shape. Each of the support member may have a slot or groove running along each longitudinal side. A support member can have multiple attachment sites (e.g., attachment sites 20 in FIG. 1) for installing accessories or devices. In one embodiment, the plurality of support members may be different in length. For example, the L3 support member 123 can be longer than the L4 support member. The support members can be made of light-weight aluminum or any suitable material. The frame 12 further includes a slider 125 for slidably connecting one support member to another support member. For example, the slider 125 connects the L3 support member to the L4 support member. The L1 and L2 support members (121, 122) can form the foundation of the frame 12, and the L3 and/or L4 support members (123, 124) can movably connect with the L1 and/or L2 support members in various configurations.

In one embodiment, one end of the L1 support member 121 is pivotably connected with a slider 1210. The slider 1210 has two opposing protrusions 1211 and 1212 that are shaped to interlock with slots (e.g., slots 1231 and 1241) extending on opposite sides of another support member (e.g., L3 support member 123 or L4 support member 124). Once the protrusions of the slider 1210 are locked into the slots of the corresponding support member, the slider is restricted to move only in a direction along the support member's longitudinal axis. In one embodiment, the L3 and L4 support members each have slots running along its length on both sides. In one example, the slider and the slots form a dovetail slide mechanism with the slider acting as a saddle that rides on the support member as a slide base.

In one embodiment, the two ends of the L2 support member 122 are pivotably connected with respective sliders 1220 and 1221. In one example (see FIG. 1), these sliders 1220 and 1221 can be respectively interlocked with slots along the side of the L1 support member 121 and slots along the longitudinal sides of the L3 support member 123. In another example, the sliders 1220 and 1221 of the L2 support member 122 can be respectively interlocked with slots along the longitudinal sides of the L1 support member 121 and slots along the longitudinal sides of the L3 support member 123. Each slider is equipped with a locking mechanism that is operable to fix the slider at a desired position on the corresponding support member. For example, the locking mechanism can have a sliding lock that can be engaged by operating a knob, thumb screw, or the like.

In one embodiment, a stable triangular frame can be formed by connecting three support members (e.g., L1, L2, and L3/L4) together with each support member connected to the other two support members using three sliders (e.g., sliders 1210, 1220, and 1221). The shape and size of the triangular frame can be adjusted by positioning (e.g., sliding) the sliders at different locations on the corresponding support members. Each support member can have one or more attachment sites (e.g., attachment sites 20) for installing various components or devices (e.g., spring-loaded damping arm 13, a vacuum-operated anchoring device, a slider 125, etc.). The adjustability of the triangular frame and the attachment sites 20 enable flexible and optimal camera positioning when using the above-described camera mount to install a camera to a surface.

The above-described camera mount can be adapted to different curved surfaces or contours on a vehicle. Using a suitable configuration and combination of the support members can improve the positioning of the anchoring devices, safety, adaptability, and flexibility of the camera mount. Furthermore, the multiple attachment sites allow the flexible placement of anchoring devices (e.g., suction cups 111) and other attachments to maximize the loading capacity of the camera mount.

In one embodiment, the spring-loaded damping arm 13 includes a right-angle bracket 131, an adjustment knob 132, a body 133, and two attachment posts 134/135. One attachment post 134 is located at a first end of the body 133 that can be attached to an attachment site of the frame 12. Another attachment post 135 is located at a second end of the body 133 that can be attached to the right-angle bracket 131. The right-angle bracket 131 has a first opening 1330 configured to receive the attachment post 135, and a second opening 1331 configured to receive other attachments. The spring-loaded damping arm 13 can be adjusted to position a camera in different angles to satisfy different shooting requirements. The spring-loaded damping arm 13 can be adjusted by using the adjustment knob 132 to adjust the tension of a spring in the damping arm 13. For example, turning the knob 132 in a first rotational direction increases the spring tension, while turning the knob 132 in a second rotational direction decreases the spring tension. Through adjusting the spring tension, the spring-loaded damping arm 13 can be configured to provide different degrees of damping for the camera.

In one embodiment, the power module 14 includes a connection plate 141 and one or more battery units 142. The battery units 142 can be coupled to opposite ends of the connection plate 141, respectively. An attachment opening 143 is provided at a center portion of the connection plate 141. The attachment opening 143 is configured to receive a matching attachment post similar to the attachment posts described in this disclosure. The power module 14 can supply power from the battery units 142 to the camera 3.

In one embodiment, the vibration isolation mechanism 15 includes a first plate 151, a second plate 153, and a plurality of wires (e.g., wires 152) connected between the first plate and the second plate. The first plate 151 and the second plate 153 are spaced or suspended from one another by the plurality of wires 152. The wires provide a non-rigid and flexible connection between the two plates to reduce the adverse effects of any hard impact on the camera. The top plate 151 has an attachment post 154 that can be connected to an attachment opening, for example, the attachment opening 143 of the power plate 14. The second plate may be equipped with an attachment mechanism, for example, a chute or slot for installing the camera 3 via a suitable adapter (e.g., auxiliary coupler 16) that interlocks with the slot. In one example, the auxiliary coupler 16 connects the vibration isolation mechanism 15 to a camera gimbal 2 that carries the camera 3. The auxiliary coupler 16 can supply power, for example, from the power module 14, to the camera gimbal 2 and/or camera 3.

Figure 3:
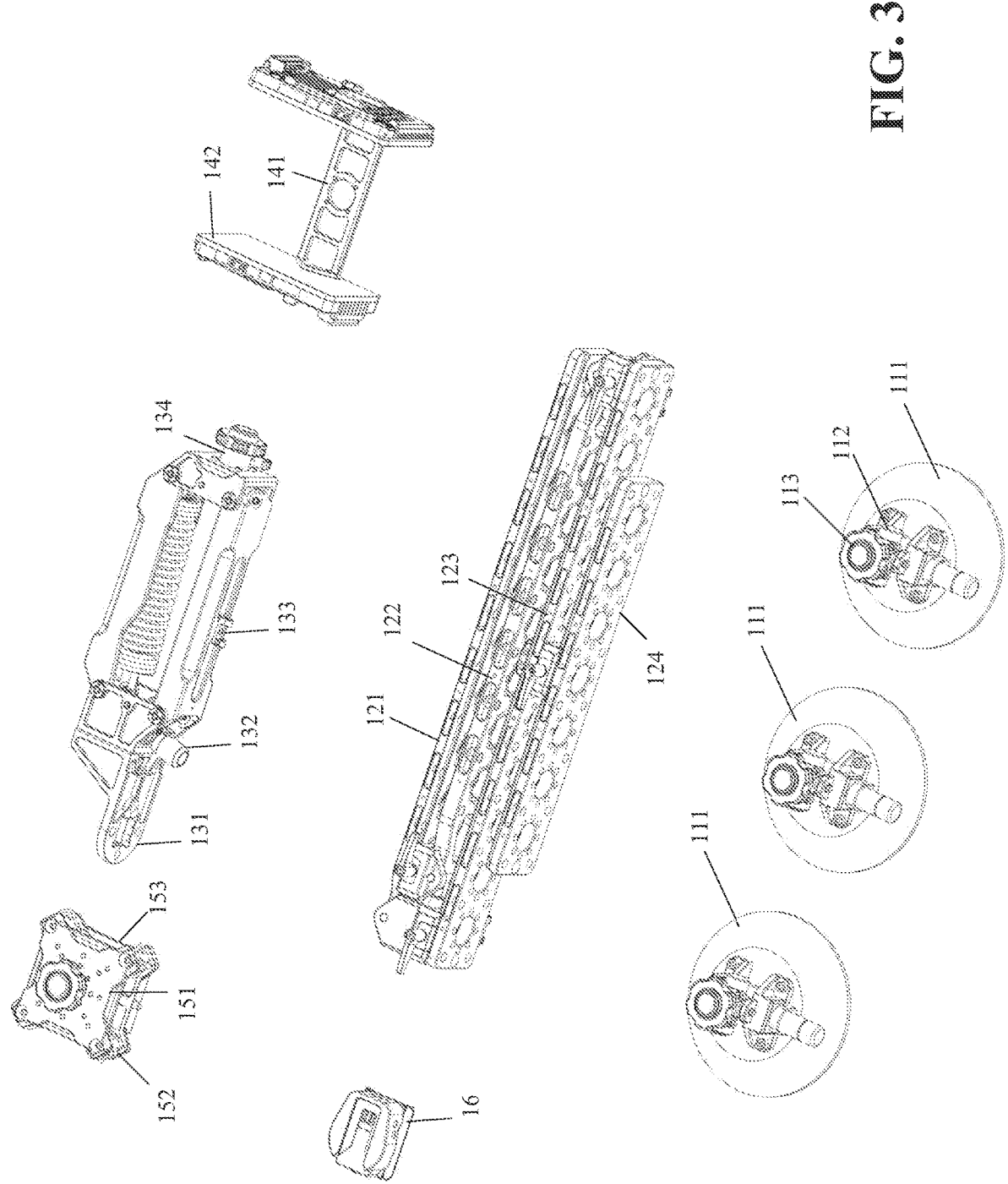

As described above in relation to FIGS. 1 and 3, the shape of the frame 12 can be quickly adjusted and reconfigured by moving the sliders (e.g., sliders 1210, 1220, and 1221). That enables the camera mount to be easily assembled for use and dissembled for storage and transport, hence saving time and expenses during shooting.

Figure 2:
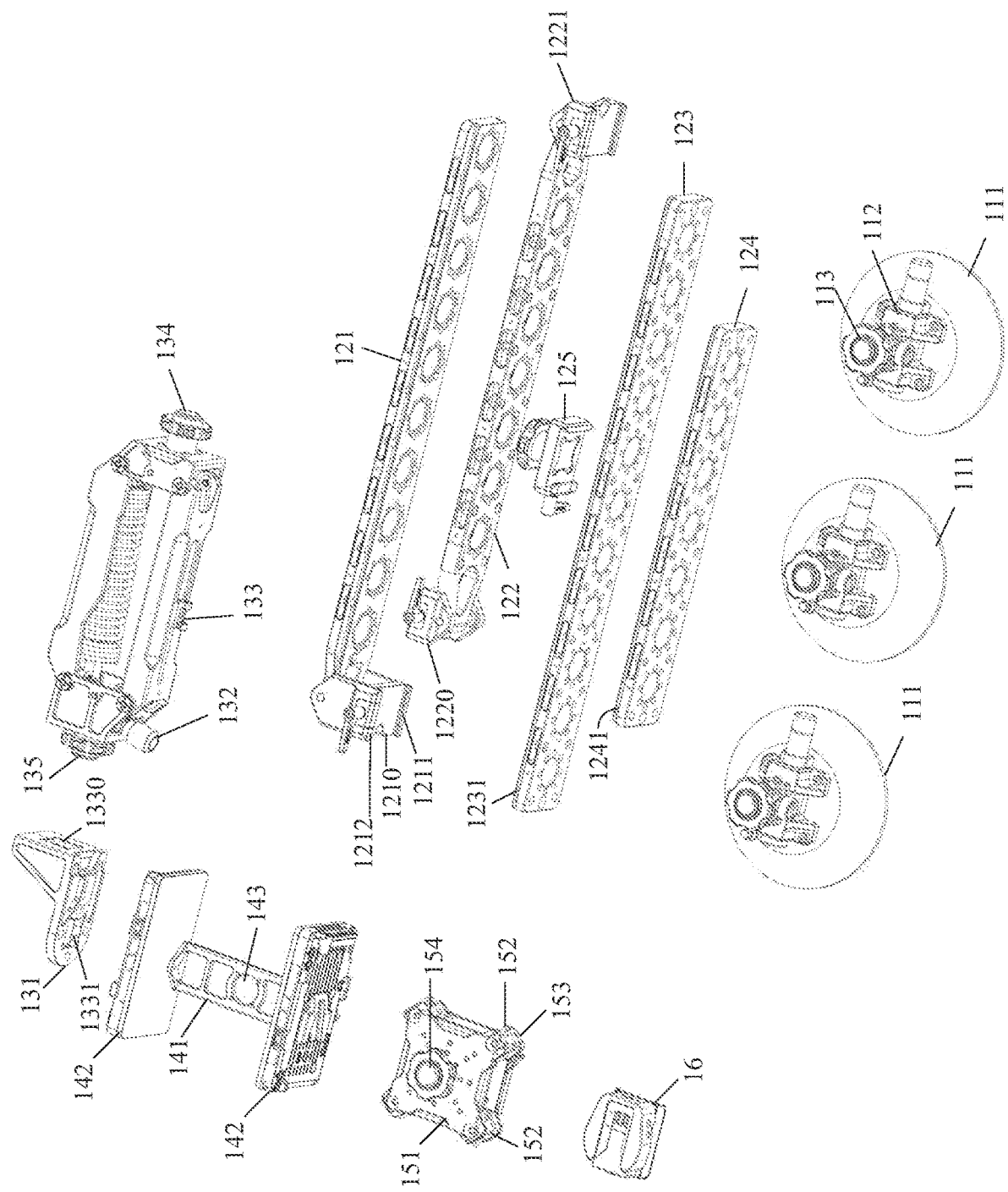
FIGS. 2 and 3 are drawings illustrating exemplary components of the camera mount.

FIGS. 4 and 5 are drawings illustrating an exemplary embodiment of an attachment mechanism according to one embodiment. The attachment mechanism includes a threaded post 1251 that can be the same as the attachment posts described in relation to FIGS. 1-3. The threaded post 1251 is installed in a frame 1252. The frame 1252 can be a part of a slider that can interlock with slots extending on the longitudinal sides of a support member 122 as described above. The threaded post 1251 can be fastened in the frame 1252 by a number of fasteners 1253. In one embodiment, the fasteners 1253 can be cylinder head bolts. However, other suitable fasteners can be used to fasten the threaded post 1251 with the frame 1252. The threaded post 1251 passes through an attachment opening 1260 at an attachment site (illustrated as the area I in FIG. 4) on a support member (e.g., support member 122) and secured by a threaded nut 1255 with matching threads. In one example, the attachment opening 1260 has a diameter of 25.1 mm. Several bolt holes 1222 surround the attachment opening 1260. In one example, each bolt hole 1222 may have a diameter (e.g., 6 mm) smaller than that of the attachment opening 1260. The bolt holes 1222 are arranged in a bolt circle surrounding the attachment opening 1260. In one example, the bolt circle may have a diameter of 34.5 mm. The dimensions and sizes of the attachment opening and bolt holes are only illustrative examples, and the present invention is not limited thereto. In other literature, the attachment mechanism described above in relation to FIGS. 4 and 5 may called a Michelle mount or similar terms.

Still referring to FIGS. 4 and 5, the threaded post 1251 is secured in the frame 1252 by the cylinder head bolts 1253. The heads of the cylinder head bolts 1253 can act as positioning pins that are received in the corresponding bolt holes 1222 on the support member. The positioning pins when situated in the bolt holes prevent the threaded post and frame assembly from rotating in the attachment opening 1260. The threaded nut 1255 when tightly mated with the threaded post 1251 can secure the threaded post 1251, frame 1252, and nut 1255 together with the frame member.

Figure 6:
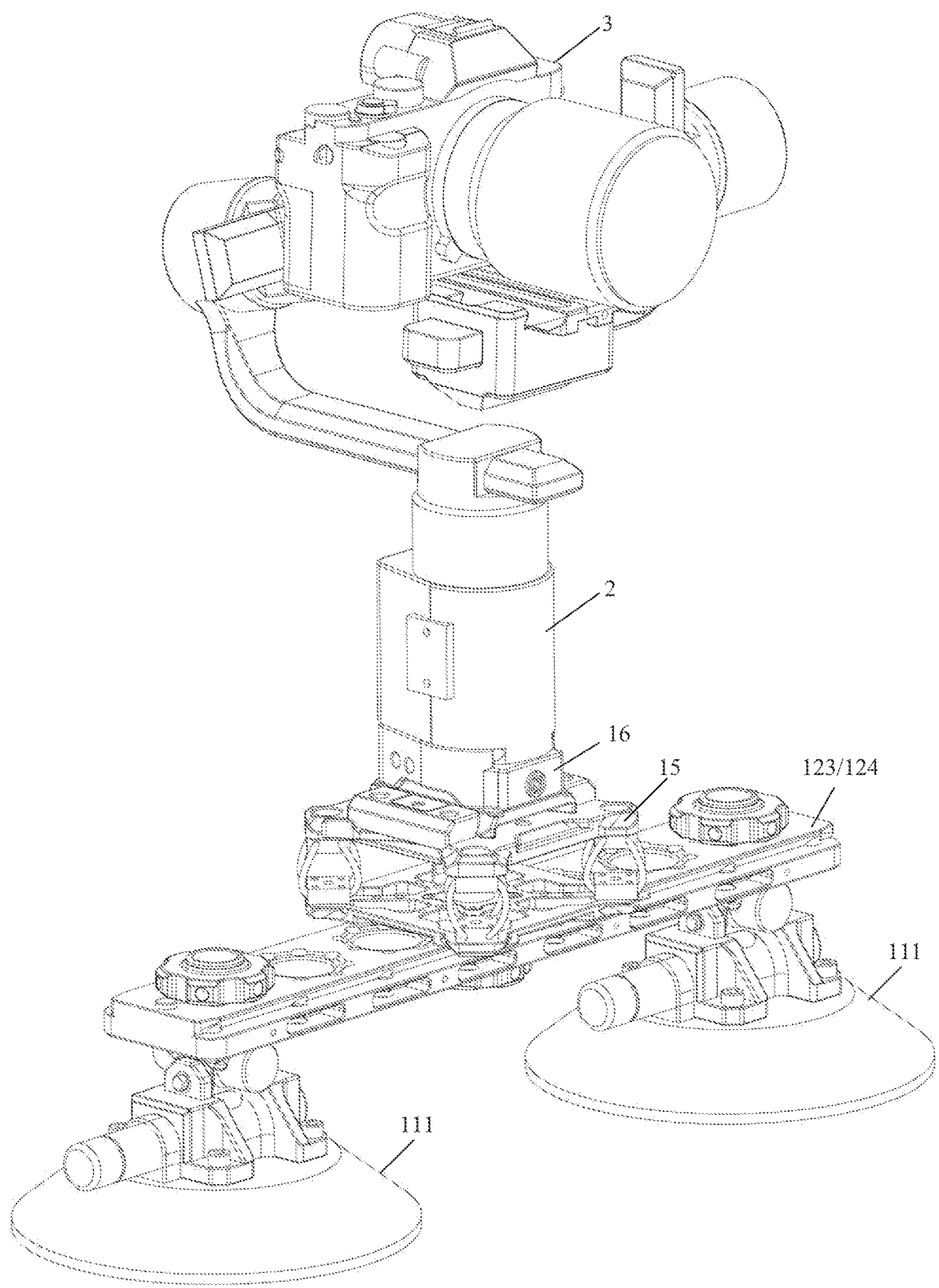
FIG. 6 is a drawing illustrating a second embodiment of the camera mount.
Figure 7:
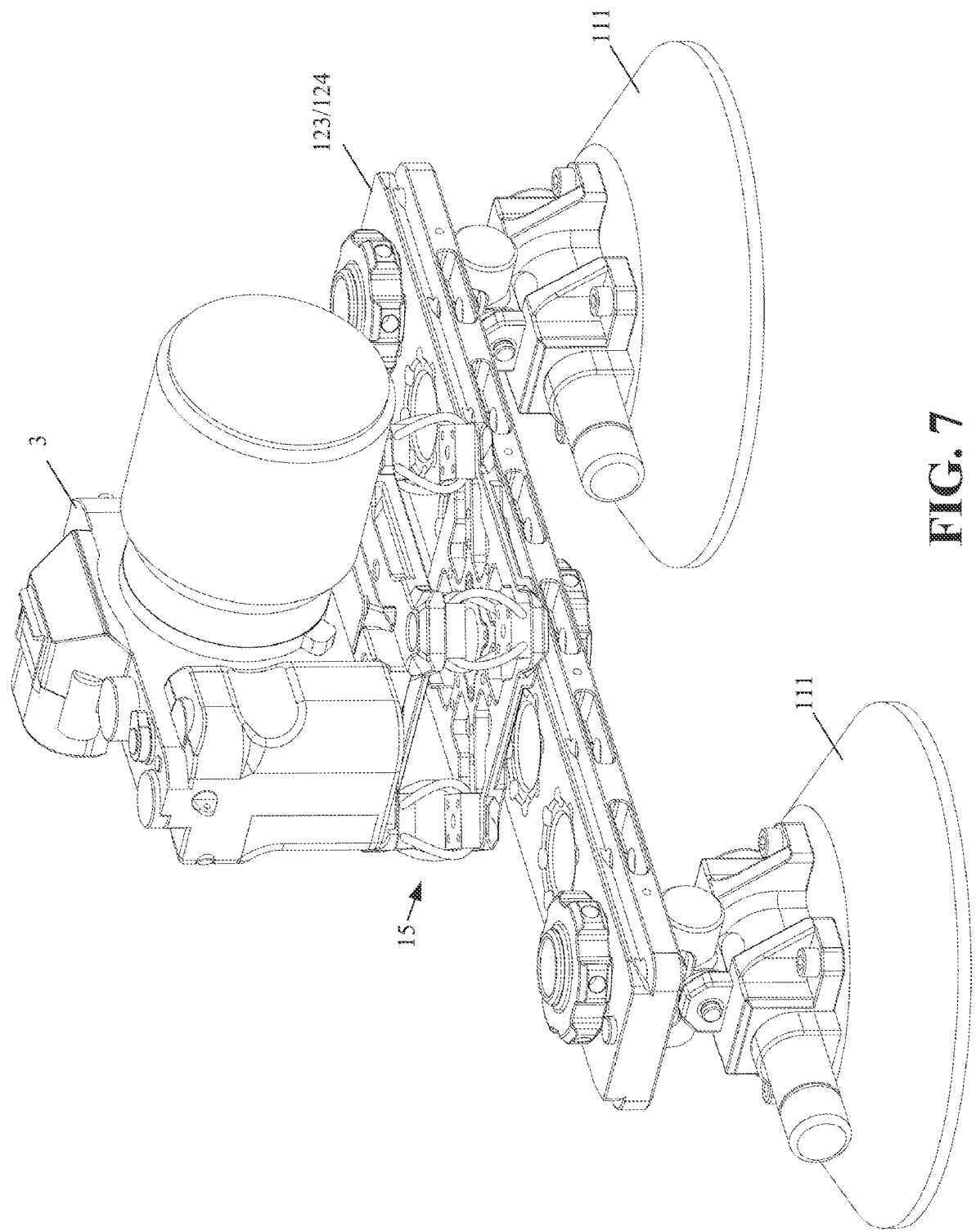
FIG. 7 is a drawing illustrating a third embodiment of the camera mount.
Figure 8:
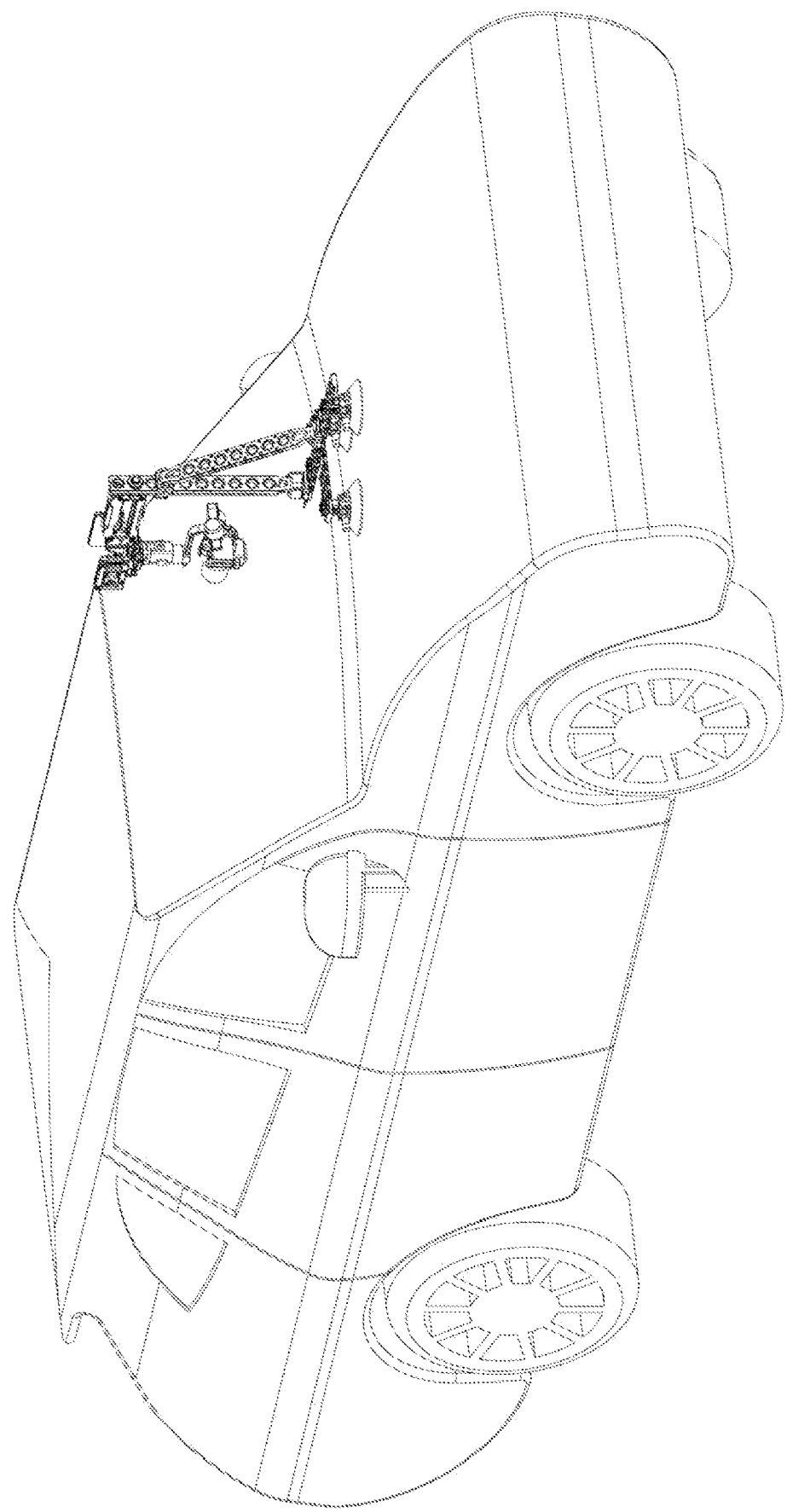
FIGS. 8-12 are drawings illustrating additional embodiments of the camera mount.
Figure 9:
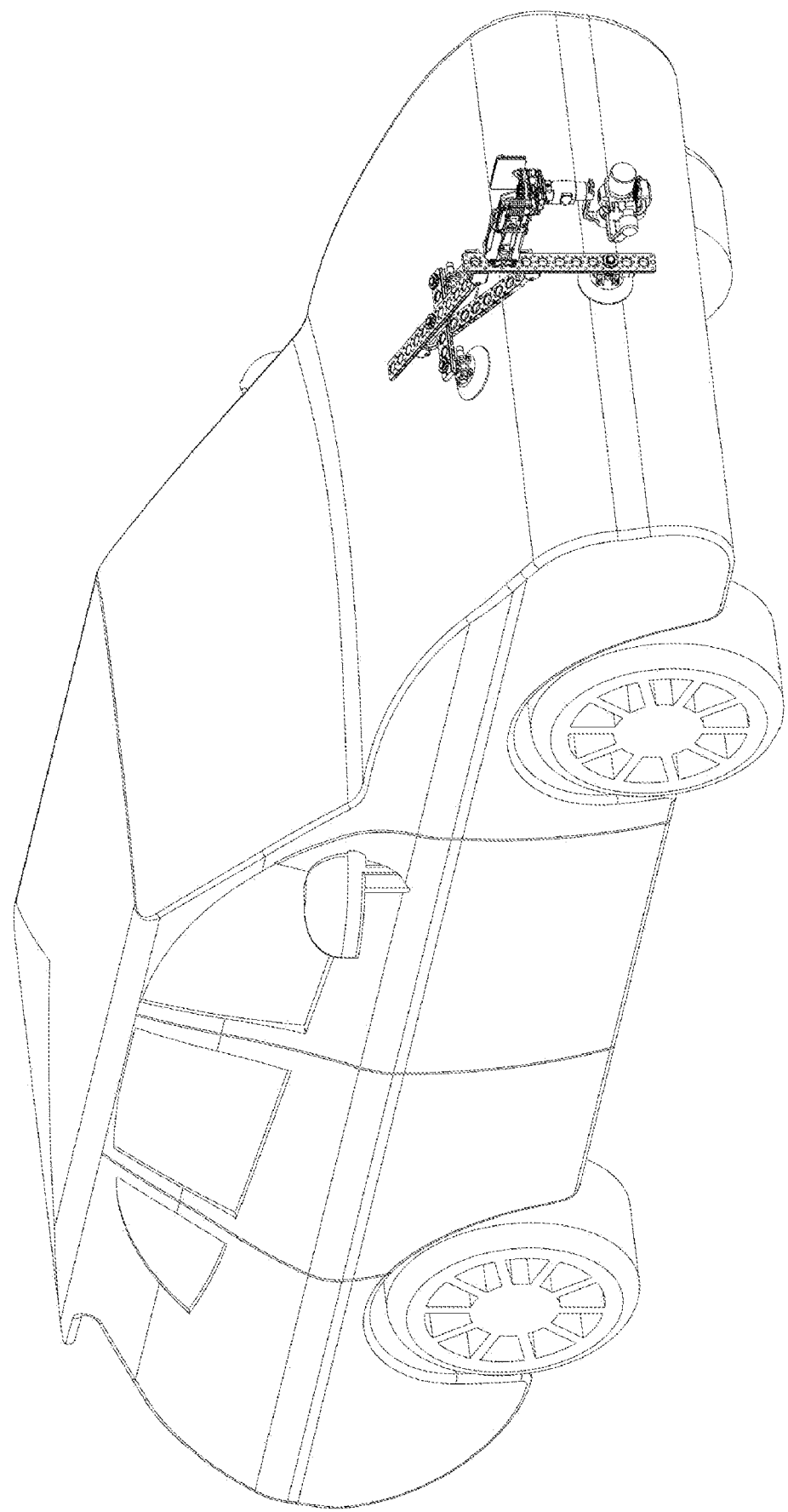
Figure 10:
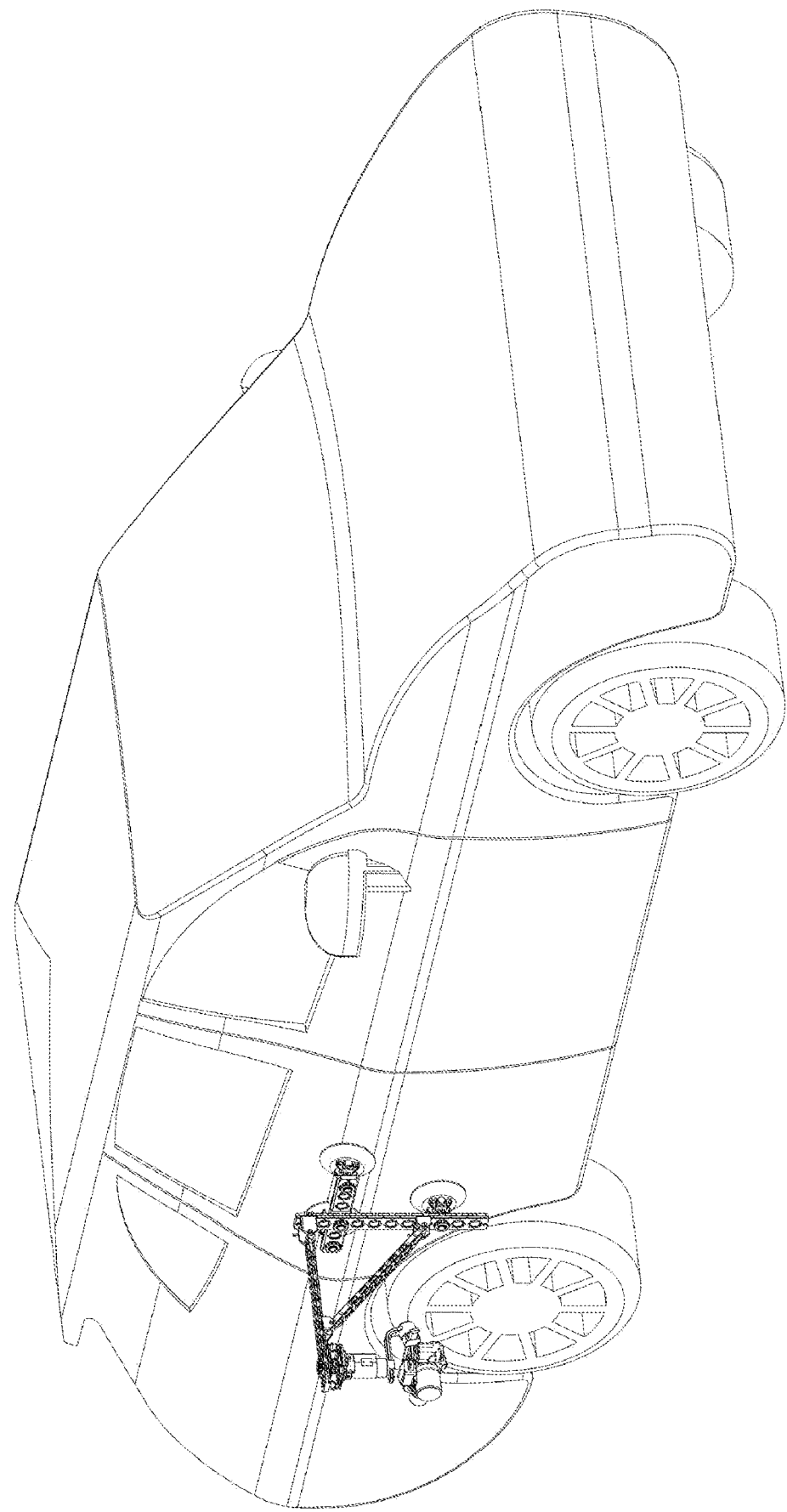
Figure 11:
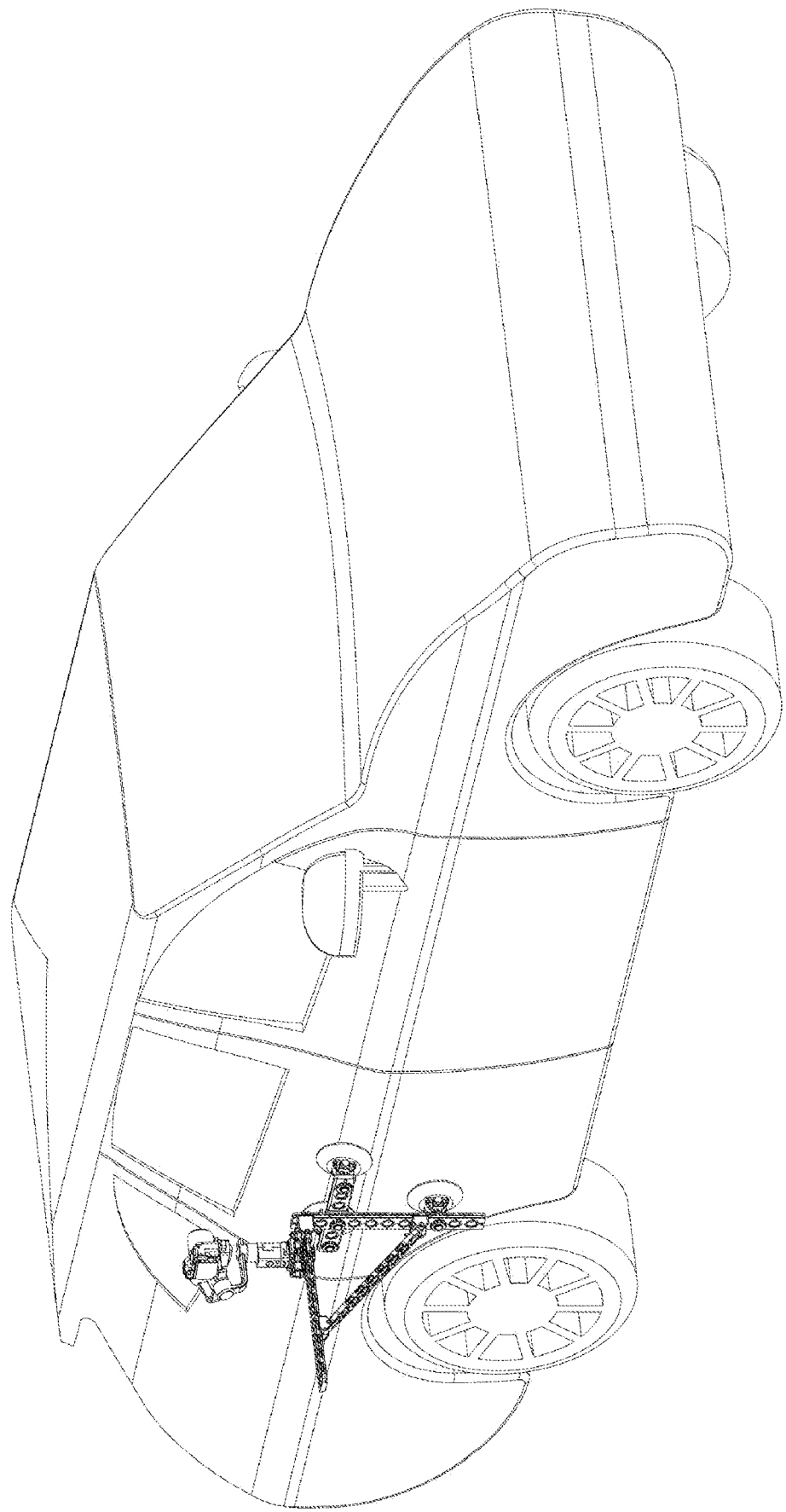
Figure 12:
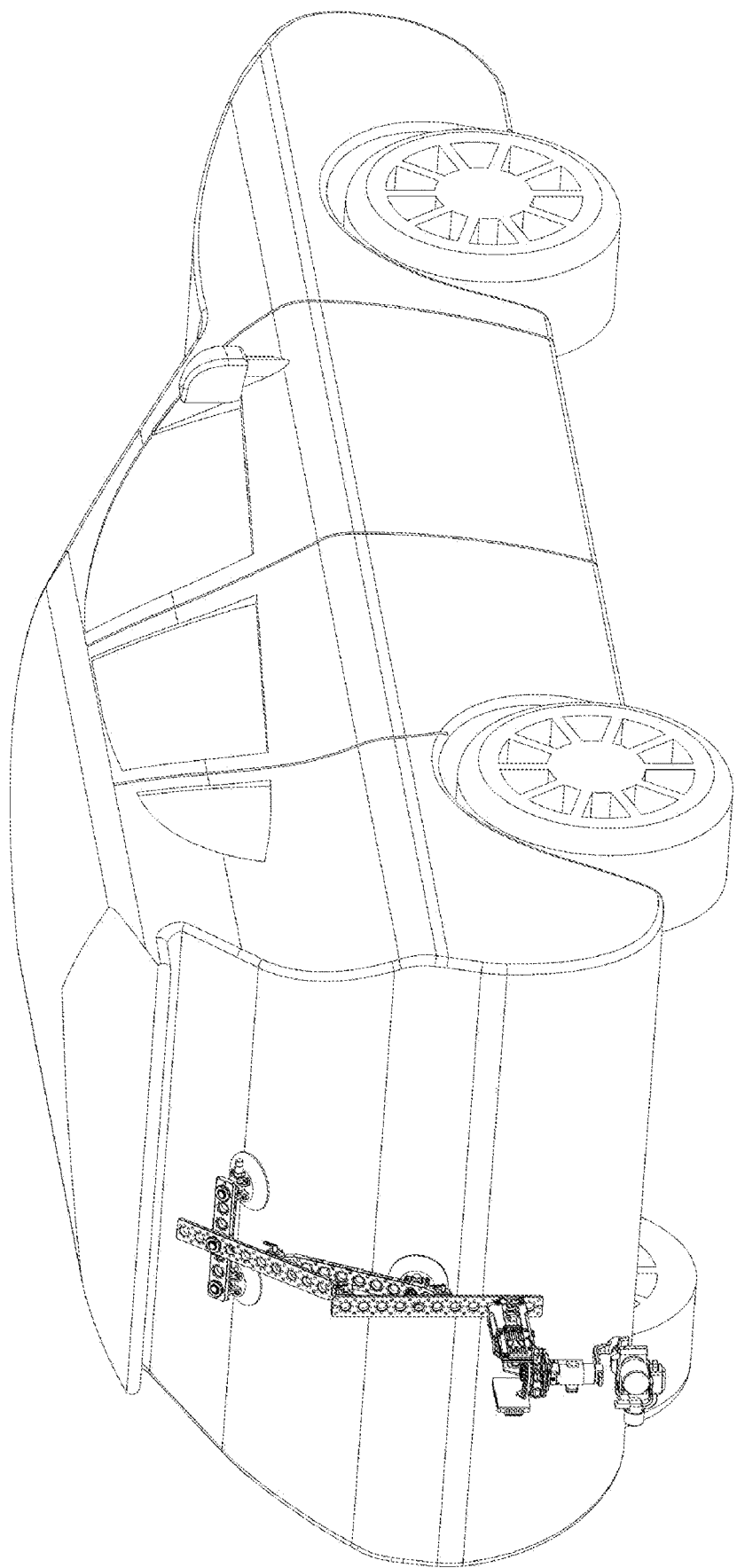

In various embodiments, a camera mount may include the spring-loaded damping arm 13 and/or vibration isolation mechanism 15. In the embodiment shown in FIG. 1, a camera mount includes both the spring-loaded damping arm 13 and vibration isolation mechanism 15. In another embodiment shown in FIG. 6, a camera mount does not include the spring-loaded damping arm 13. It would be appreciated that the support members described above can be configured and used in different frame configurations including one or more of the support members. In one embodiment, a camera mount includes only one support member (e.g., support member 123 or 124). In one embodiment, the camera mount does not include the camera gimbal 2 and auxiliary coupler 16. FIGS. 8 to 12 are drawings illustrating different configurations of the camera mount installed on an exemplary vehicle.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A camera mount for mounting a camera on a surface comprising:
   a frame comprising a plurality of elongated members removably and slidably connected to one another, the frame being adjustable in length on at least one side of the frame by sliding a first elongated member relative to a second elongated member among the plurality of elongated members;
   at least two vacuum-operated anchoring devices removably attached to the frame, each of the at least two vacuum-operated anchoring devices being pivotable around two axes with respect to the frame; and
   a damping mechanism attached to the frame for holding the camera and dampening vibration on the camera.

2. The camera mount of claim 1, wherein the plurality of elongated members form a triangular frame, the triangular frame being adjustable in length on at least one side of the triangular frame by sliding a first elongated member relative to a second elongated member among the plurality of elongated members.

3. The camera mount of claim 2, wherein the at least two vacuum-operated anchoring devices comprise a first anchoring device and a second anchoring device that are respectively connected to a same one of the plurality of elongated members.

4. The camera mount of claim 2,
   wherein at least one elongated member of the plurality of elongated members comprises a plurality of attachment sites arranged in a longitudinal direction of the at least one elongated member, and
   wherein an attachment site of the plurality of attachment sites comprises a first opening and a plurality of second openings surrounding the first opening, the first opening and the plurality of second openings being coplanar with one another, and a diameter of the first opening being larger than a diameter of the second opening.

5. The camera mount of claim 4, wherein a first anchoring device of the at least two vacuum-operated anchoring devices comprises:
   a suction cup;
   an attachment post extending from a surface of the suction cup, the attachment post retained in the first opening of the attachment site; and
   a plurality of positioning pins retained in the plurality of second openings of the attachment site, preventing the attachment post from rotating in the first opening.

6. The camera mount of claim 4, wherein the damping mechanism comprises a spring-loaded damping arm comprising a first end and a second end opposite the first end, the first end removably connected to the attachment site, the second end removably connected to the camera.

7. The camera mount of claim 4, wherein the damping mechanism comprises:
   a first plate,
   a second plate facing and spaced from the first plate; and
   a plurality of wires configured to suspend the first plate from the second plate, the plurality of wires configured to dampen vibration transfer between the first plate and the second plate.

8. The camera mount of claim 1, wherein the at least two vacuum-operated anchoring devices comprise a first anchoring device and a second anchoring device that are respectively connected to different elongated members of the plurality of elongated members.

9. The camera mount of claim 1, further comprising a power module configured to supply power to the camera.

10. The camera mount of claim 1, wherein each of the at least two vacuum-operated anchoring devices is restricted to rotate around at least one axes with respect to the frame.

11. A camera mount for mounting a camera on a surface comprising:
    a frame comprising a plurality of elongated members removably and slidably connected to one another;
    at least two vacuum-operated anchoring devices removably attached to the frame, each of the at least two vacuum-operated anchoring devices being pivotable around two axes with respect to the frame; and
    a damping mechanism attached to the frame for holding the camera and dampening vibration on the camera,
    wherein the plurality of elongated members comprise a first elongated member, a second elongated member, and a third elongated member, the first elongated member being slidably connected with the second elongated member and the third elongated member.

12. The camera mount of claim 11,
    wherein the first elongated member comprises a first slider pivotably connected to an end of the first elongated member, and the first slider movably connected with the third elongated member, and
    wherein the second elongated member comprises a second slider pivotably connected to a first end of the second elongated member and a third slider pivotably connected to a second end of the second elongated member, the second slider movably and slidably connected with the first elongated member, and the third slider movably and slidably connected with the third elongated member.

13. The camera mount of claim 12, wherein the first slider comprises a locking mechanism operable to fix a position of the first slider with respect to the third elongated member.

14. The camera mount of claim 11,
    wherein the plurality of elongated members further comprise a fourth elongated member, and
    wherein the third elongated member comprises a slider removably attached to the third elongated member, and the slider movably and slidably connected with the fourth elongated member.

15. A camera mount for mounting a camera on a surface comprising:
    an adjustable frame comprising a plurality of elongated members removably and slidably connected to one another, at least one of the plurality of elongated members comprises a plurality of attachment sites arranged in a longitudinal direction of the elongated member, each of the attachment sites comprising:
      a first opening and a plurality of second openings surrounding the first opening, the first opening and the plurality of second openings being coplanar with one another, and a diameter of the first opening being larger than a diameter of the second opening; and
    a plurality of vacuum-operated anchoring devices removably attached to the adjustable frame in a planar area defined by the adjustable frame, each of the plurality of anchoring devices restricted to be pivotable around at least one axis with respect to the adjustable frame.

16. The camera mount of claim 15, wherein at least two of the elongated members are different in their respective lengths.

17. The camera mount of claim 15, wherein a first anchoring device of the plurality of vacuum-operated anchoring devices comprises:

a suction cup;

an attachment post extending from a surface of the suction cup, the attachment post received in the first opening of a corresponding attachment site on one of the plurality of elongated members;

a fastener engaging one end of the attachment post to retain the attachment post in the first opening; and a plurality of positioning pins received in the plurality of second openings of the attachment site, preventing the attachment post from rotating in an axial direction of the first opening.

18. The camera mount of claim 15, further comprising:

a spring-loaded damping arm comprising a first end and a second end opposite the first end, the first end removably connected to the attachment site, the second end removably connected to the camera.

19. The camera mount of claim 15, further comprising:

a wire-suspended damping mechanism coupled between the camera and the adjustable frame to dampen vibration on the camera.

20. A camera mount system comprising:

a plurality of support members for forming an adjustable frame for holding a camera, a first support member of the plurality of support members comprising a slider pivotably connected to one end of the first support member, the slider configured to removably and slidably connect to a second support member of the plurality of support members; and a plurality of vacuum-operated anchoring devices configured to be connected to the adjustable frame for removably attaching the adjustable frame to a surface, each of the plurality of vacuum-operated anchoring devices comprising a rotating mechanism that restricts each anchoring device to rotate around at least one axis.

21. The camera mount system of claim 20, further comprising:

a damping mechanism configured to be coupled between the camera and the adjustable frame for dampening vibration on the camera.

22. The camera mount system of claim 21, wherein each of the plurality of support members comprises a plurality of attachment sites arranged in a longitudinal direction of the support member, each of the attachment sites comprising:

a first opening and a plurality of second openings surrounding the first opening, the first opening and the plurality of second openings being coplanar with one another, and a diameter of the first opening being larger than a diameter of the second opening.

23. The camera mount system of claim 22, wherein the plurality of vacuum-operated anchoring devices are configured to be removably attached to respective attachment sites of the plurality of attachment sites, and each of the vacuum-operated anchoring devices comprises an attachment post and at least one locking pin configured to restrict a rotation of the attachment post in the first opening.

* * * * *